US012468063B2

(12) United States Patent
Zoboyan et al.

(10) Patent No.: US 12,468,063 B2
(45) Date of Patent: Nov. 11, 2025

(54) APPARATUS FOR VERTICAL SCREENING

(71) Applicant: Analogic Corporation, Peabody, MA (US)

(72) Inventors: Sevag Zoboyan, Wakefield, MA (US); Steven Weed, Marblehead, MA (US); Steven Urchuk, Melrose, MA (US); Tom Ripp, Amherst, NH (US)

(73) Assignee: Analogic Corporation, Peabody, MA (US)

( * ) Notice: Subject to any disclaimer, the term of this patent is extended or adjusted under 35 U.S.C. 154(b) by 329 days.

(21) Appl. No.: 18/164,404

(22) Filed: Feb. 3, 2023

(65) Prior Publication Data

US 2024/0264331 A1 Aug. 8, 2024

(51) Int. Cl.
*G01N 23/00* (2006.01)
*G01N 23/046* (2018.01)
*G01V 5/226* (2024.01)

(52) U.S. Cl.
CPC ............ *G01V 5/226* (2024.01); *G01N 23/046* (2013.01); *G01N 2223/419* (2013.01)

(58) Field of Classification Search
CPC ................. G01N 2223/419; G01N 23/046
See application file for complete search history.

(56) References Cited

U.S. PATENT DOCUMENTS

| 10,624,596 | B2 | 4/2020 | Gregerson et al. |
| 10,724,973 | B2 | 7/2020 | Paresi |
| 10,845,499 | B2 | 11/2020 | Paresi |
| 10,918,345 | B2 | 2/2021 | Knox |
| 11,234,659 | B2 | 2/2022 | Weed et al. |
| 2004/0247069 | A1 | 12/2004 | Arai et al. |

FOREIGN PATENT DOCUMENTS

| KR | 10-2019-0055539 A | 5/2019 |
| WO | 2020/018515 A1 | 1/2020 |

OTHER PUBLICATIONS

WO2020/0181515. Jan. 23, 2020. (Year: 2020).*
International Search Report of International Application No. PCT/US2024/014086, mailed Jun. 13, 2024, 3 pages.
Written Opinion of the International Searching Authority of International Application No. PCT/US2024/014086, mailed Jun. 13, 2024, 6 pages.
"HiRise—Bilateral, Weight-Bearing CT Imaging of the Hip, Knee and Lower Extremities With Non-Weight Baring Capabilities for the Upper Extremities." https://curvebeamai.com/products/hirise/, CurveBeam AI, (2020), 8 pages.
OnSight 3D Extremity System, Brochure, (Apr. 2019), 8 pages, Carestream Health, Inc.
Products, https://curvebeamai.com/products/, CurveBeam AI, retrieved Feb. 13, 2023, 9 pages.

* cited by examiner

*Primary Examiner* — Dani Fox
(74) *Attorney, Agent, or Firm* — TraskBritt

(57) ABSTRACT

A computer tomography (CT) imaging system is disclosed. The CT imaging system includes a rotatable gantry and a lift. The rotatable gantry forms a bore defining an examination region. The rotatable gantry is oriented with a central axis thereof in a substantially vertical direction and is configured to scan one or more objects in a substantially horizontal plane. The lift is aligned with an opening of the examination region. At least a portion of the lift is sized to fit within the examination region and is configured to move the one or more objects into the examination region.

20 Claims, 7 Drawing Sheets

APPARATUS FOR VERTICAL SCREENING

TECHNICAL FIELD

The present disclosure generally relates to vertical computed tomography (CT) scanning including multi-row CT scanning and cone beam CT scanning, for example, in security screening. More particularly, the present disclosure relates to vertical CT scanning utilizing a CT imaging system with a rotatable gantry with a vertically oriented axis and configured to operate in a horizontal plane.

BACKGROUND

In conventional CT imaging systems, and in particular, CT imaging systems for security screening, a rotatable gantry is physically connected to a frame by means of a mechanical bearing with the rotatable gantry arranged to operate in a vertical plane and to rotate about a horizontally oriented axis. In medical CT imaging systems, it is common for the axis of the gantry to tilt up to +/−30 degrees from a vertical plane that bisects the gantry. Some CT imaging systems are configured for operation in the horizontal orientation and in general oblique orientations. These CT imaging systems are typically intended to image objects, such as subjects in a standing or sitting position or air cargo. However, the rotatable gantries of these systems are configured to translate along the axis of an object to image the object. Translation of the rotor assembly increases the complexity, cost, and size of the screening system. In addition, the use of bearings to support these structures limits the size of the object that can be scanned and increases the size of the gantry support structure.

The above-described background relating to CT imaging systems is merely intended to provide a contextual overview of some current issues and is not intended to be exhaustive. Other contextual information may become apparent to those of ordinary skill in the art upon review of the following description, which includes example embodiments.

In one illustrative embodiment, the present disclosure provides a CT imaging system. The CT imaging system includes a rotatable gantry, a lift, and one or more vertical bearings. The rotatable gantry forms a bore defining an examination region. The rotatable gantry is oriented with a central axis thereof in a substantially vertical direction and is configured to scan one or more objects in a substantially horizontal plane. The lift is aligned with an opening of the examination region. At least a portion of the lift is sized to fit within the examination region and is configured to move the one or more objects into the examination region. The one or more vertical bearings configured to rotationally support the rotatable gantry in the substantially vertical direction relative to the central axis and to support the weight of the rotatable gantry.

In another illustrative embodiment, the present disclosure provides a CT imaging system. The CT imaging system includes a rotatable gantry, a stationary support frame, and one or more thrust bearings. The rotatable gantry forms a bore defining an examination region. The rotatable gantry is oriented with a central axis thereof in a substantially vertical direction and is configured to scan one or more objects in a substantially horizontal plane. The stationary support frame is configured to support the rotatable gantry in a translationally fixed position. The one or more thrust bearings positioned between the stationary support frame and the rotatable gantry and configured to support the weight of the rotatable gantry and facilitate rotation of the rotatable gantry about the central axis relative to the stationary support frame.

In a further illustrative embodiment, the present disclosure provides a method for scanning one or more objects with a computer tomography (CT) imaging system. The method includes vertically aligning one or more objects with an examination region defined by a rotatable gantry of the CT imaging system. The method includes vertically translating the one or more objects into the examination region using a lift aligned with the examination region. The method further includes scanning the one or more objects within the examination region utilizing one or more radiation sources mounted on the rotatable gantry.

BRIEF DESCRIPTION OF THE DRAWINGS

The present disclosure is illustrated and described herein with reference to the various drawings, in which like reference numbers are used to denote like system components/method acts, as appropriate, and in which.

DETAILED DESCRIPTION

In various embodiments, the present disclosure relates to systems and methods for CT imaging. The CT imaging system includes a rotatable gantry with a central axis thereof arranged substantially vertical and a lift configured to vertically translate objects into and out of an examination region of the rotatable gantry. A frame rotatably supports the rotatable gantry via vertical bearing structure(s). In various embodiments, horizontal bearing(s) are configured to ensure that the rotatable gantry rotates substantially about the vertically oriented central axis thereof.

Figure 1:
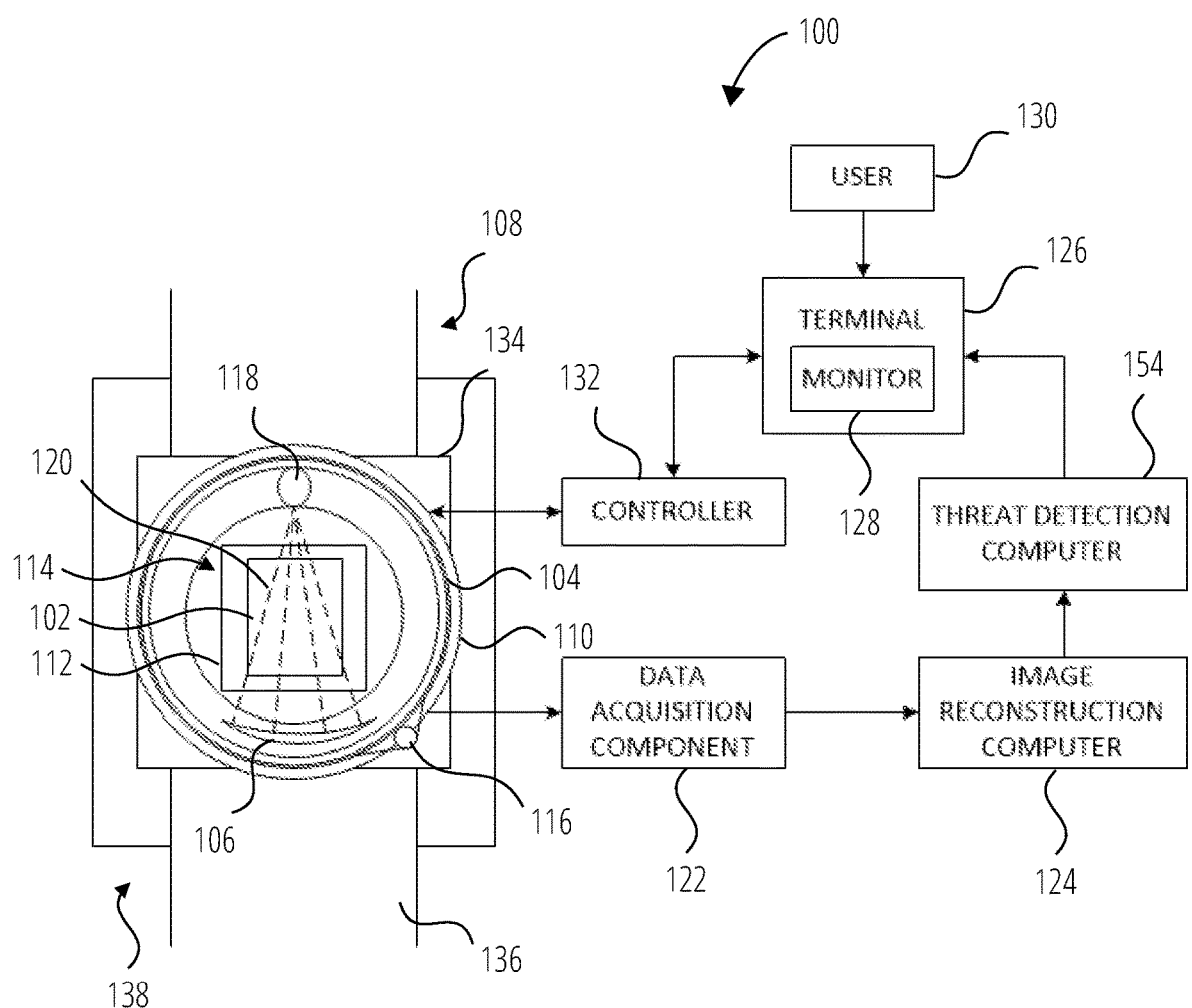
FIG. 1 is a schematic diagram of one illustrative embodiment of a scanning system including a CT imaging system of the present disclosure.

FIG. 1 is a schematic diagram of one illustrative embodiment of a scanning system 100 including a CT imaging system 108 of the present disclosure. More particularly, FIG. 1 illustrates an example CT imaging modality that may be configured to acquire volumetric information regarding one or more objects 102 under examination and generate images therefrom. It may be appreciated that the scanning system 100 is merely an example and is not intended to be interpreted in a limiting manner, such as necessarily specifying the location, inclusion, and/or relative arrangement of the components depicted therein. Non-limiting examples of CT imaging system 108 include a multi-row CT imaging system and a cone beam CT imaging system.

In the embodiment illustrated, the scanning system 100 includes a CT imaging system 108, an object translation system 138, a data acquisition component 122, an image reconstruction computer 124, a threat detection computer 154, a terminal 126, and a controller 132. In various embodiments, the object translation system 138 includes a conveyor 136 and a lift 112. The conveyor 136 is configured to move the one or more objects 102 to and from the lift 112. The lift 112 is configured to move the one or more objects 102 vertically relative to the CT imaging system 108.

The CT imaging system 108 is configured to examine one or more objects 102 (e.g., a series of boxes, without limitation). In various embodiments, the CT imaging system 108 includes a rotatable gantry 104 (also referred to as a rotatable drum), a stationary member 110, a motor 116, one or more radiation sources 118, a detector array 106, and a support system 134.

In various embodiments, the rotatable gantry 104 is positioned within the stationary member 110 and is configured to rotate relative to the stationary member 110 and is rotated by the motor 116. The rotatable gantry 104 forms a bore that defines an examination region 114 therein. The examination region 114 is configured to receive the lift 112 with the one or more objects 102 supported thereby. The rotatable gantry 104 includes shielding, such as X-ray shielding. In various embodiments, the rotatable gantry 104 is formed from one or more aluminum castings, upon which the shielding is mounted, along with other imaging components such as an X-ray source, high voltage power supply and X-ray detectors.

The rotatable gantry 104 is oriented with the central axis thereof in a substantially vertical direction (i.e., a direction of gravity) and is configured to scan the one or more objects 102 in a substantially horizontal plane (transverse or substantially perpendicular to the vertical direction). In various embodiments, the rotatable gantry 104 is configured to rotate about the central axis thereof. In some of these various embodiments, the rotatable gantry 104 is rotated by a motor, such as a servo motor or an alternating current motor. The motor may directly drive the rotatable gantry 104 or may indirectly drive the rotatable gantry 104, such as via a drive belt.

During an examination of the one or more objects 102, the one or more objects 102 are positioned on lift 112, the lift 112 moves the one or more objects 102 into the examination region 114 and the rotatable gantry 104 is rotated about the one or more objects 102 by the motor 116 while the one or more objects 102 are positioned within the examination region 114. In various embodiments, the lift 112 is configured to selectively move the one or more objects 102 during the examination process to capture various images of the one or more objects 102.

The one or more radiation sources 118 are positioned on the rotatable gantry 104 facing towards the examination region 114 and are configured to rotate therewith. In various embodiments, the one or more radiation sources 118 include at least one source selected from an x-ray source, linear accelerator, and other ionizing radiation sources. The detector array 106 is mounted on a side of the rotatable gantry 104 and positioned substantially diametrically opposite to the one or more radiation sources 118. During an examination of the one or more objects 102, the one or more radiation sources 118 emit fan, cone, wedge, and/or other shaped radiation 120 configurations into the examination region 114. It may be appreciated that such radiation may be emitted substantially continuously and/or may be emitted intermittently (e.g., a short pulse of radiation is emitted followed by a resting period during which the one or more radiation sources 118 is not activated) and energy can be changed during radiation emission or in between scans.

As the radiation 120 emitted by the one or more radiation sources 118 traverses through the one or more objects 102, the radiation 120 may be attenuated differently by different aspects of the one or more objects 102. Because different aspects attenuate different percentages of the radiation 120, an image(s) may be generated based upon the attenuation, or variations in the number of radiation photons that are detected by the detector array 106. For example, more dense aspects of the one or more objects 102, such as a metal plate, may attenuate more of the radiation 120 (e.g., causing fewer photons to be detected by detector array 106) than less dense aspects, such as clothing.

The detector array 106 is configured to directly convert (e.g., using CdZnTe, an array of readout electronics, and/or other direct conversion materials, without limitation) and/or indirectly convert (e.g., using a scintillator(s) such as CdWO4 and/or other indirect conversion materials, without limitation, and an array of photo sensors) the detected radiation into signals that may be transmitted from the detector array 106 to the data acquisition component 122 (e.g., typically positioned on rotatable gantry 104, without limitation). In various embodiments, the detector array 106 includes at least one detector selected from among a multi-row CT detector and a flat panel detector.

The one or more radiation sources 118 and the detector array 106 are arranged to allow objects of a predetermined maximum diameter to be scanned at a rate determined by the length of the detector array 106 and a rotation speed of the rotatable gantry 104. In various embodiments, the one or more radiation sources 118 includes a fixed anode X-ray source, which may facilitate operation of the one or more radiation sources 118 in the horizontal plane.

The Scan Field of View (SFOV) achievable by the CT imaging system 108 is determined by a diameter of the bore defined by the rotatable gantry 104, an aperture for the one or more radiation sources 118, and the arrangement of the detector array 106. In various embodiments, for smaller objects typical of a security checkpoint, the CT imaging system 108 is configured for a SFOV of about 85 centimeters (cm). In other embodiments, such as for scanning pallets and larger items, the CT imaging system 108 is configured for a SFOV of up to about 280 centimeters (cm).

The CT imaging system 108 may be enclosed in a shielded compartment (radiation/X-ray), include attenuating curtains or doors (radiation/X-ray), be within a shielded room, or be arranged with a combination thereof.

In various embodiments, the data acquisition component 122 is mounted on the rotatable gantry 104 and may be part of detector array 106. The data acquisition component 122 is configured to convert the signals generated by the detector array 106. In various embodiments, the data acquisition component 122 is configured to convert analog signals output by the detector array 106 into digital signals and/or to compile signals that were transmitted within a predetermined time interval, or measurement interval, using various techniques (e.g., integration, photon counting, without limitation). It may be appreciated that such a measurement interval may be referred to as a "view" and generally reflects signals generated from the radiation 120 that were emitted while the one or more radiation sources 118 was at a particular angular range relative to the one or more objects 102. In various embodiments, the lift 112 is configured to move the one or more objects 102 in the vertical direction relative to the one or more radiation sources 118 during measurement intervals. Based upon the compiled signals, data acquisition component 122 may generate projection data indicative of the compiled signals, for example.

Information may be transmitted between components physically attached to the rotatable gantry 104 (e.g., such as the detector array 106 and/or the data acquisition component 122, without limitation) and components that are not physically attached to the rotatable gantry 104 (e.g., such as the image reconstruction computer 124, without limitation) through a contactless datalink. By way of example, the raw projection data generated by the data acquisition component 122 may be transmitted via a communication system to the image reconstruction computer 124 positioned on the stationary side of the imaging modality. Such a communication system may include, among other things, a first transceiver (e.g., mounted to the rotatable gantry 104, without limitation), a contactless datalink (e.g., including a first antenna mounted to the rotatable gantry 104 and a second antenna mounted to the stationary member 110, without limitation), and a second transceiver (e.g., mounted to the stationary member 110, without limitation). In this way, information may be transferred between the rotatable gantry 104 and the stationary member 110.

The image reconstruction computer 124 is configured to receive the raw projection data that is output by the data acquisition component 122 (e.g., or output from the communication system, without limitation). The image reconstruction computer 124 is also configured to generate image space data from the projection space data using a suitable analytical, iterative, and/or other reconstruction technique (e.g., back projection reconstruction, tomosynthesis reconstruction, iterative reconstruction, without limitation). In this way, the data is converted from projection space to image space (e.g., image(s)), a domain that may be more understandable by a user 130 viewing the image(s), for example.

As used herein, data or information representative of an object may be referred to herein as imaging data. That is, imaging data may be used to generically refer to data or information in the projection space domain and/or in the image space domain that is representative of an object presently under examination and/or that previously underwent an examination.

The threat detection computer 154 is configured to obtain the image space data from the image reconstruction computer 124 and analyze the image space data to detect potential threats contained within the one or more objects 102.

The terminal 126, or workstation (e.g., a computer, without limitation), is configured to receive the image space data (e.g., image(s)) and any threats identified by the threat detection computer 154, which can be displayed on a monitor 128 for the user 130 (e.g., security personnel, medical personnel, without limitation). In this way, the user 130 can inspect the image(s) and review the detected threats to identify areas of interest within one or more objects 102. The terminal 126 can also be configured to receive user input which can direct operations (via the controller 132) of the scanning system 100, such as a speed to rotate the rotatable gantry 104 and movement of the conveyor 136.

In various embodiments, the controller 132 is operably coupled to the terminal 126 and the CT imaging system 108. The controller 132 is configured to receive input from the terminal 126, such as user input, for example, and to generate instructions for the CT imaging system 108 indicative of operations to be performed. For example, the user 130 may desire to examine the one or more objects 102 and the controller 132 may issue a command instructing the lift 112 to bring the one or more objects 102 into the examination region 114 for scanning of the one or more objects 102.

While the data acquisition component 122, the image reconstruction computer 124, the threat detection computer 154, the terminal 126, and the controller 132 are described as separate components, in various embodiments, two or more of these components are combined into a single component/system (e.g., the image reconstruction computer 124 and the threat detection computer 154 are implemented on a single computer, the terminal 126 and the controller 132 are implemented as a single system, without limitation).

In one embodiment, additional transceivers may be configured to create at least two logical channels for the transmission of information over a physical channel of a contactless or contact datalink. A first logical channel may be utilized for transmitting a first type of information in a first direction and a second logical channel may be utilized for transmitting a second type of information in second direction. In this way, one or more types of information may be transmitted bi-directionally over the contactless datalink. Types of information transmitted over the contactless datalink may include, among other things, control data, status information, and/or timing information.

Figure 2:
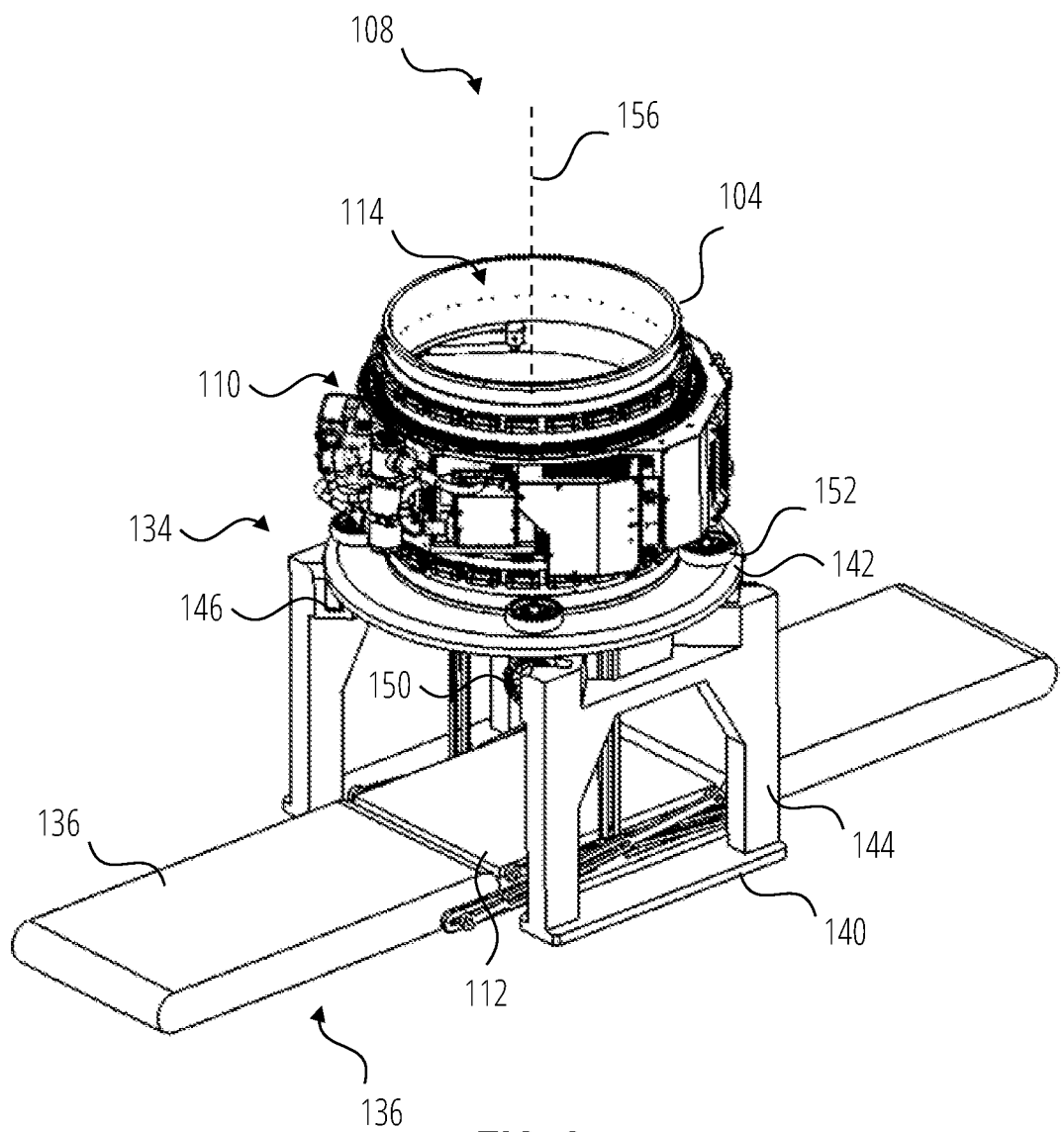
FIG. 2 is a perspective view of an embodiment of the CT imaging system of FIG. 1.
Figure 3:
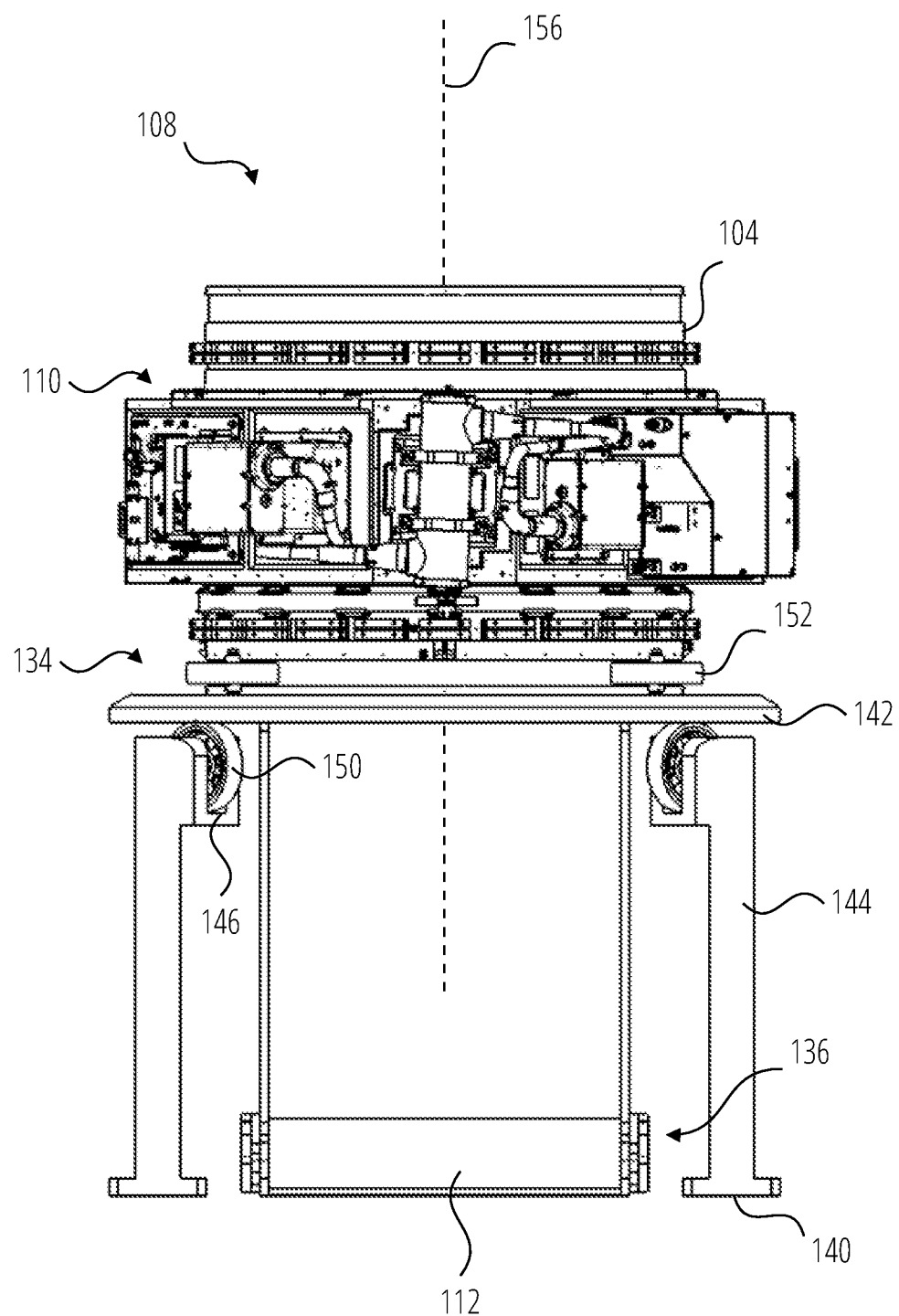
FIG. 3 is a side view of the embodiment of the CT imaging system of FIG. 2.

FIG. 2 is a perspective view of a CT imaging system 108 of FIG. 1, in accordance with one or more examples. FIG. 3 is a side view of the embodiment of the CT imaging system 108 of FIG. 2. In the specific non-limiting example depicted by FIGS. 2 and 3, CT imaging system 108 includes a rotatable gantry 104, a detector array 106, a lift 112, an examination region 114, a support system 134, a conveyor 136, an object translation system 138, a frame 140, and a support portion 142. Frame 140 includes multiple legs 144 and respective slots 146 defined therein. Support portion 142 includes one or more vertical bearings 150 and one or more horizontal bearings 152.

While not illustrated by FIGS. 2 and 3, CT imaging system 108 may include one or more housings that cover one or more portions of CT imaging system 108, including rotatable gantry 104, lift 112, frame 140, or support portion 142; as non-limiting examples to: protect CT imaging system 108 from the environment (e.g., electrical noise, debris, improper handing/maintenance, without limitation), protect the environment from x-ray radiation generated by CT imaging system 108, guide operation of one or more portions of CT imaging system 108, or obscure the operation of CT imaging system 108.

In various embodiments, frame 140 includes a support portion 142 configured to support the rotatable gantry 104 and the stationary member 110. In some of these embodiments, the support portion 142 is a plate. In various embodiments, the frame 140 includes legs 144 extending from the support portion 142. In various embodiments, the frame 140 is a stationary support frame configured to support both the assembly of the rotatable gantry 104 and to rotate the CT imaging system 108. More specifically, frame 140 maintains vertical positioning (e.g., maintains a vertical elevation with respect to conveyor 136, lift 112, or the ground, without limitation) and horizontal positioning (e.g., maintains a horizontal distance with respect to lift 112, without limitation) of the rotatable gantry 104 while allowing and supporting rotation of the CT imaging system 108 via vertical bearings 150 and horizontal bearings 152. While FIG. 2 illustrates rotatable gantry 104 positioned above lift 112, in other embodiments, rotatable gantry 104 may be positioned below lift 112 and lift 112 may be configured to lower into an examination region 114 of rotatable gantry 104. Vertical displacement of an object both up and down is contemplated by this disclosure. In various embodiments, the CT imaging system 108 is configured to perform scans while the one or more objects 102 is being raised by the lift 112, while the one or more objects 102 is held stationary within examination region 114 by the lift 112, and while the one or more objects 102 is being lowered by the lift 112.

In the embodiment illustrated by FIG. 2, the legs 144 are configured to support the rotatable gantry 104 and the stationary member 110 at an elevated position above the object translation system 138, and in particular, above the lift 112, with enough space between a bottom of the assembly of the rotatable gantry 104 and the stationary member 110 and a top of the object translation system 138 for the one or more objects 102 (e.g., checked baggage, carryon baggage, personal items, or cargo, without limitation) to pass therebetween. In various embodiments, the frame 140 is constructed as a machined weldment, utilizing a material such as steel or Aluminum, without limitation. The legs 144 are formed or machined from metal tubes and the support portion 142 is formed or machined from a metal plate. In various embodiments, the assembly of the rotatable gantry 104 and the stationary member 110 are supported by the frame 140 with the rotatable gantry 104 supported via one or more vertical bearings 150 (e.g., thrust/axial bearings, without limitation) and one or more horizontal bearings 152 (e.g., radial bearings, without limitation). In particular, in various embodiments, the one or more vertical bearings 150 are configured to at least partially support the rotatable gantry 104 in the substantially vertical direction (i.e., to support the weight of the rotatable gantry 104 in a direction to oppose gravity and in an axial direction relative to the central axis 156) and to facilitate rotation of the rotatable gantry 104 about the central axis 156 relative to the frame 140. The one or more horizontal bearings 152 are configured to maintain a rotation of the rotatable gantry 104 about the central axis 156 thereof (e.g., central axis 156), and in particular, to stabilize the rotatable gantry 104 and maintain a substantially concentric rotation of the rotatable gantry 104 about the central axis 156. In various embodiments, the motor is coupled to at least one of the horizontal bearings 152 and is configured to cause rotation of the rotatable gantry 104 utilizing the at least one of the horizontal bearings 152.

In various embodiments, the bearings, including the one or more vertical bearings 150 and the one or more horizontal bearings 152, include at least one bearing structure chosen from wheel mechanisms, air bearings, and a combination of wheel mechanisms and air bearings. In the embodiment illustrated in FIGS. 2 and 3, the support portion 142 includes slots 146 formed or machined in a material of support portion 142. Slots 146 are configured to receive the one or more vertical bearings 150, such as one wheel mechanism in each of the slots 146. In various embodiments, the CT imaging system 108 includes multiple sets of one or more horizontal bearings 152, such as one set of one or more horizontal bearings 152 located at each end of the rotatable gantry 104. In various embodiments, the one or more horizontal bearings 152 are positioned between the rotatable gantry 104 and a support structure for the rotatable gantry 104, such as the stationary member 110.

In some of the various embodiments where the one or more vertical bearings are air bearings, the one or more vertical bearings 150 are arranged to provide an air gap between the rotatable gantry 104 and the respective air bearings/frame 140 during operation of the CT imaging system 108 and to rotationally support the rotatable gantry 104 in an axial direction relative to the central axis 156 and to support the weight/load of the rotatable gantry 104. In some of the various embodiments where the one or more horizontal bearings are air bearings, the one or more horizontal bearings 152 are arranged to provide an air gap between the rotatable gantry 104 and the respective air bearing/housing of the CT imaging system 108.

As noted above, in various embodiments, the object translation system 138 includes a conveyor 136 and a lift 112. Again, the conveyor 136 is configured to transport the one or more objects 102 to and from the lift 112. In various embodiments, the conveyor 136 includes a front portion configured to transport the one or more objects 102 to the lift 112 and a back portion configured to transport the one or more objects 102 away from the lift 112. In various embodiments, the front portion is selected from among a belted conveyor and powered rollers, and the back portion is selected from among a belted conveyor, powered, rollers, and unpowered rollers.

The lift 112 is aligned with the examination region 114, at least a portion of the lift 112 is sized to fit within the examination region 114 and is configured to move one or more objects 102 supported thereby to and from examination region 114. In various embodiments, the lift 112 is positioned below the rotatable gantry 104 and is configured to raise the one or more objects 102 up into the examination region 114 of the rotatable gantry 104. In other embodiments, the lift 112 is positioned above the rotatable gantry 104 and is configured to lower the one or more objects 102 into the examination region 114 of the rotatable gantry 104. In various embodiments, the lift 112 includes a scissor lift configured to raise and lower the one or more objects 102 into and out of the examination region 114. However, any suitable mechanism for vertical displacement may be utilized to move the one or more objects into and out of the examination region 114, such as, a hydraulic lift, a pulley system, and the like.

In various embodiments, CT imaging system 108 includes a conveyor 136 configured to position the one or more objects 102 thereon prior to a scanning process and is configured to transport the one or more objects 102 away from lift 112, after the scanning process is complete. In various embodiments, the lift 112, and in particular, at least the portions of the lift 112 received within the examination region 114 include material transparent to the radiation 120, such as plastic, carbon fiber and the like. By forming at least a portion of the lift 112 of a material/materials transparent to the radiation 120, image artifacts generated by the lift 112 may be reduced. Any type of bi-directional lifting mechanism can be used to raise or lower the lift 112 from a positioned adjacent to the conveyor 136 to one or more positions within the examination region 114, such as a hydraulic system, a pulley system, a scissor lift, a screw system (such as a worm gear), and the like.

In various embodiments, the object translation system 138 includes an ambulatory device such as a robotic vehicle, without limitation, configured to move the one or more objects 102 adjacent to the rotatable gantry 104, such as directly below or directly above the rotatable gantry 104 (e.g., on a track or path, without limitation). In various embodiments, the robotic vehicle is configured to raise or lower the one or more objects 102 into the examination region 114 for the scanning thereof. In other embodiments, the robotic vehicle is configured to stop on a lifting system, such as the lift 112 and bi-directional lifting mechanism discussed above, which is then raised or lowered by the lifting system into the examination region 114 with the one or more objects 102.

In various embodiments, the CT imaging system 108 is configured to scan the one or more objects 102 using a mode selected from among: making a first scan of an object during translation at a constant speed at one energy and one rotational speed; rescanning the object while translating in the opposite direction at a different speed and/or the same or a different energy as the first scan; scanning at fixed vertical locations of the one or more objects 102 in response to one of locations selected by an operator of the CT imaging system 108, a detected anomaly or detected threat at the locations; and scanning the one or more objects 102 during translation with the rotatable gantry 104 stationary and in a known angular position to produce a high resolution projection image of the one or more objects 102. In various embodiments, the rotatable gantry 104 is configured to scan at different energies and translation speeds, and to generate image data at different energies and translation speeds (e.g., generate first image data at a first energy and translation speed and generate second image data at a second, different, energy and translation speed, without limitation). In various examples, a scan performed with the one or more objects 102 in fixed vertical locations is performed with a rotation speed, energy, and total radiation dose that is different than a first scan that detected the anomaly or threat.

In various embodiments, the rotatable gantry 104 is rotated for a select rotational amount during the scan of the one or more objects 102. The specific rotational angle for the select rotational amount may be based on a particular scanning environment and the particular objects intended to be scanned. In various embodiments, the rotational angle is from 200 degrees to 360 degrees (e.g., for some multi-row detector applications, without limitation). In other embodiments, the CT imaging system rotates continuously through multiple 360-degree rotations.

In various embodiments, the scanning system 100 is configured for screening objects for air cargo, hold baggage, and/or checkpoint screening. In other embodiments, the scanning system 100 is configured for screening scenarios, for food carts industrial imaging, medical imaging, and other non-destructive testing.

Figure 4A:
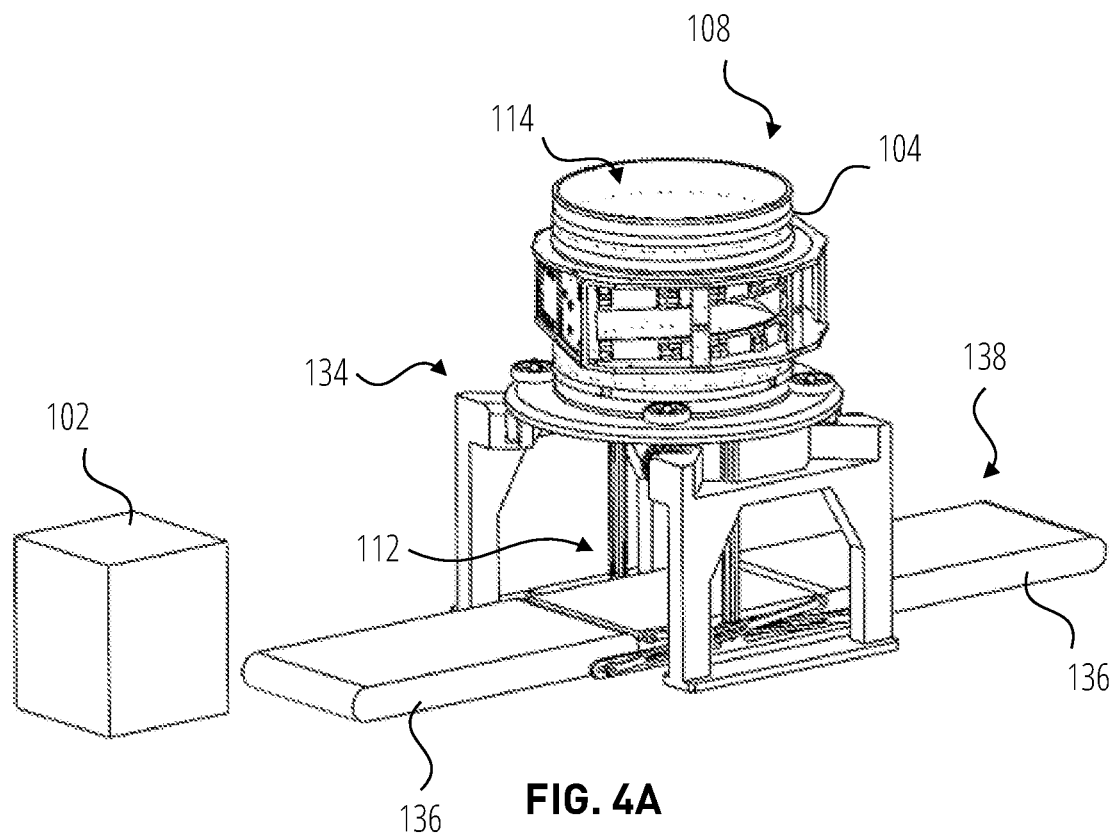
FIGS. 4A-4F are perspective views of the embodiment of the CT imaging system of FIGS. 2 and 3 illustrating a scanning process utilizing the CT imaging system.
Figure 4B:
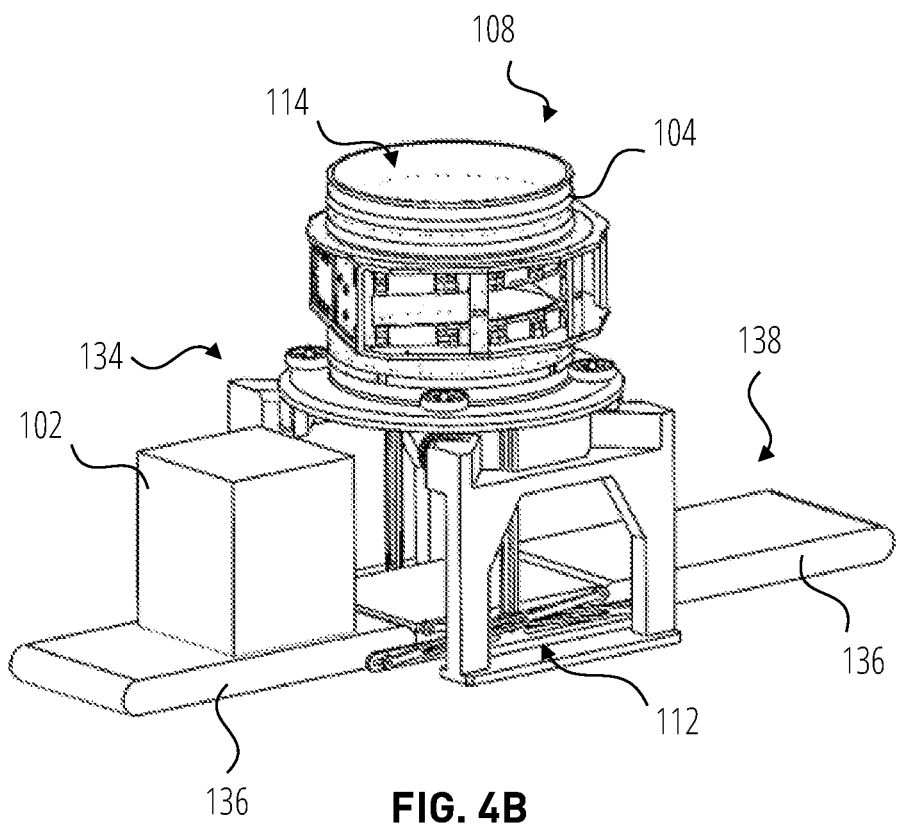
Figure 4C:
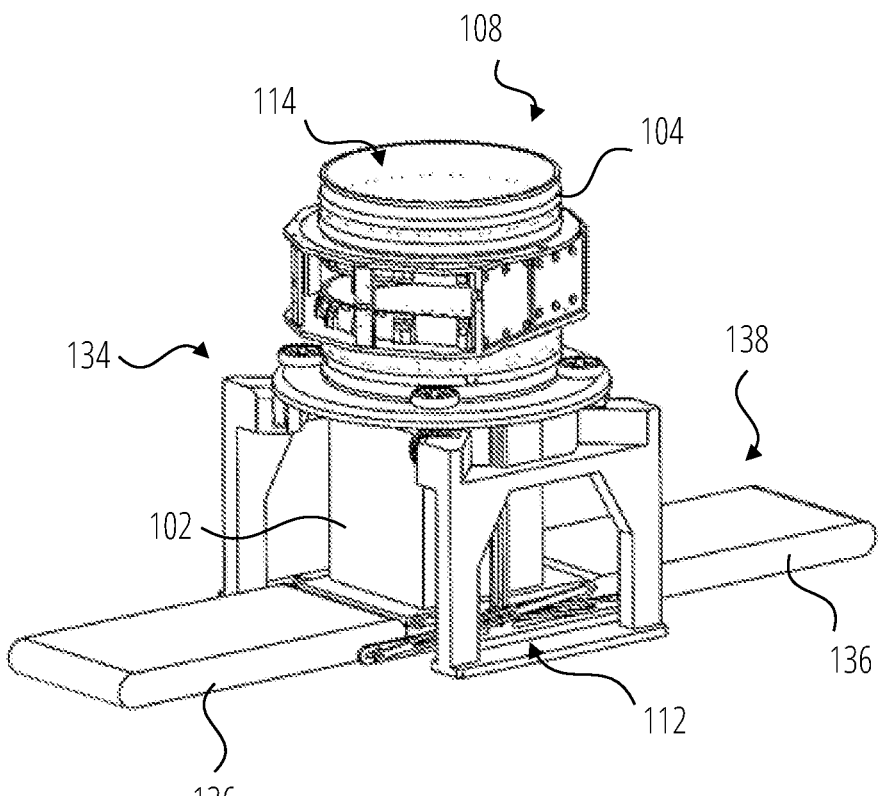
Figure 4D:
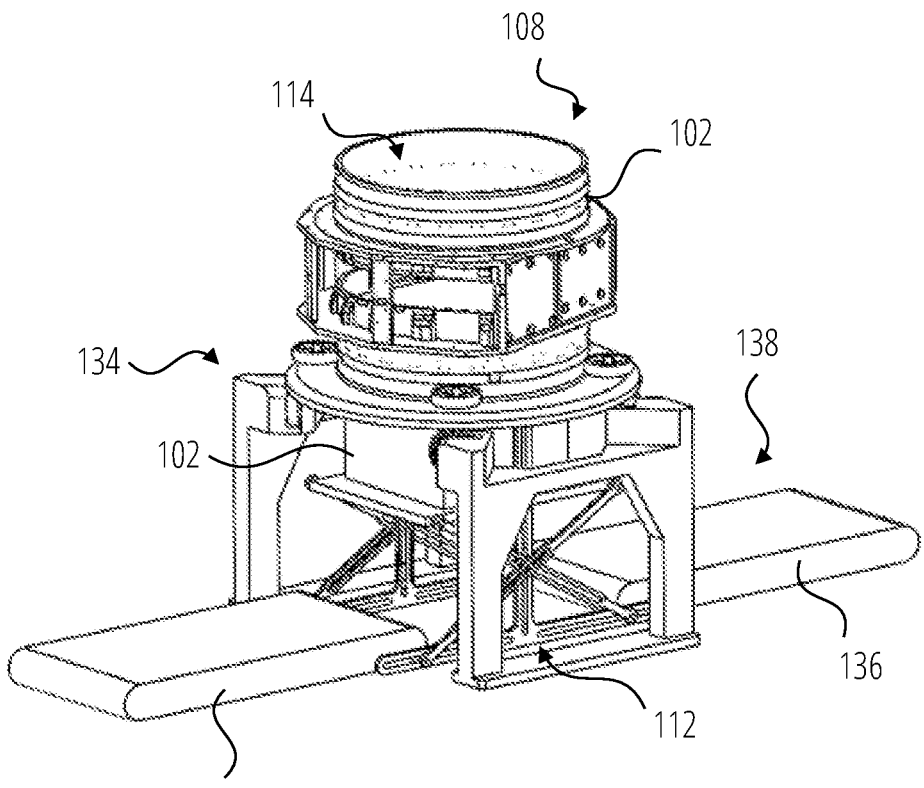
Figure 4E:
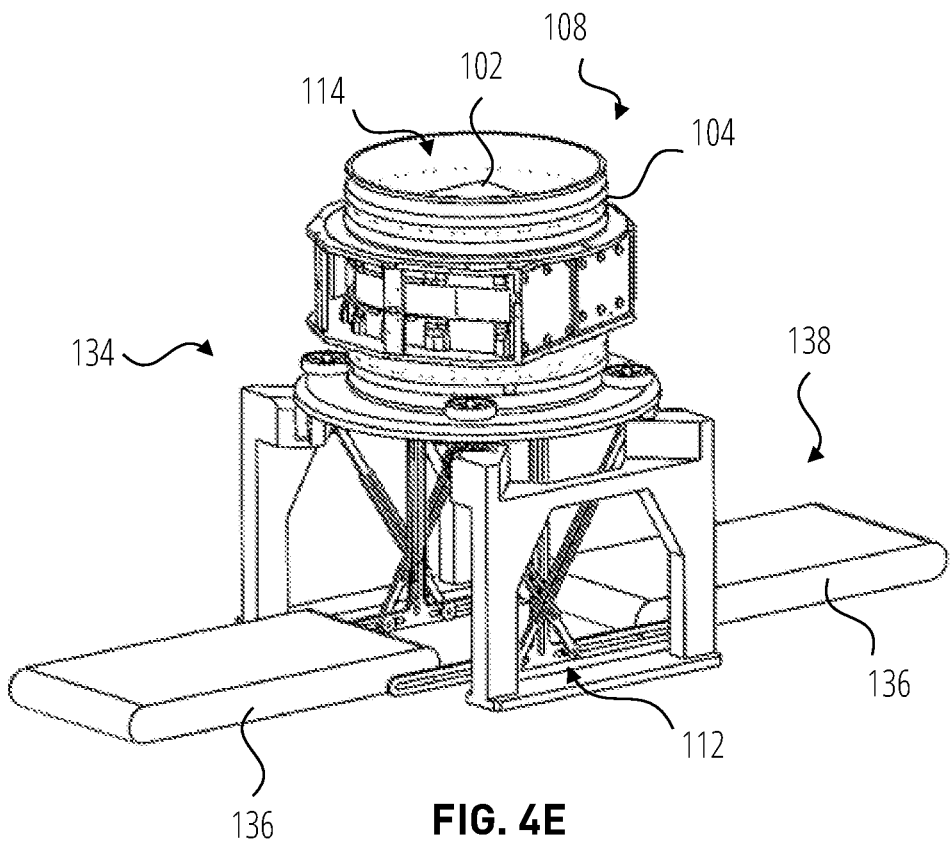

FIGS. 4A-4F are perspective views of the embodiment of the CT imaging system of FIGS. 2 and 3 illustrating a scanning process utilizing the CT imaging system. FIG. 5 is a flowchart of one illustrative embodiment of a method 500 for scanning one or more objects in accordance with the present disclosure. In various examples, one or more acts of method 500 may be controlled by controller 132 of FIG. 1.

The method 500 includes vertically aligning one or more objects with an examination region defined by a rotatable gantry of a CT imaging system at act 502. In various embodiments, the examination region is examination region 114 of any of the embodiments disclosed above. In various embodiments, as illustrated in FIGS. 4A-4C, act 502 includes moving the one or more objects (e.g., one or more objects 102) on a conveyor, such as conveyor 136, to position the one or more objects directly below or directly above the examination region (for example, the one or more objects positioned within a region sized to match an opening into the examination region, the region aligned vertically with the opening of the examination region). In some of these embodiments, the one or more objects are positioned on a lift, such as lift 112, which is arranged above or below the examination region, the lift configured to fit through the opening of the examination region.

The method 500 includes vertically translating the one or more objects into the examination region using a lift aligned with the examination region at act 504 (i.e., moving the one or more objects in a direction opposite gravity or in a direction with gravity). In various embodiments, as illustrated in FIGS. 4C-4E, act 504 includes moving the one or more objects 102 vertically with the lift 112. In various embodiments, act 504 includes elevating the one or more objects with the lift.

The method 500 further includes scanning the one or more objects within the examination region utilizing one or more radiation sources mounted on the rotatable gantry at act 506. In various embodiments, act 506 includes capturing images of the one or more objects in measurement intervals and vertically moving the lift relative to the one or more radiation sources between the measurement intervals.

In various embodiments, act 506 is performed by a mode selected from among: scanning in a first rotational direction during rotation of the rotatable gantry at one energy and one rotational speed; rescanning in a second rotational direction (opposite the first rotational direction) at a different energy than the one energy; scanning at a fixed vertical location of the one or more objects in response to one of a location selected by an operator of the CT imaging system, a detected anomaly at the location, and a detected threat at the location; and scanning the one or more objects with the rotatable gantry stationary and in a known angular position to produce a high resolution image of the one or more objects. In various embodiments, the scan performed with the one or more objects in a fixed vertical location is performed with a rotation speed, energy, and total radiation dose that is different than of a first scan that detected the anomaly or threat.

Figure 4F:
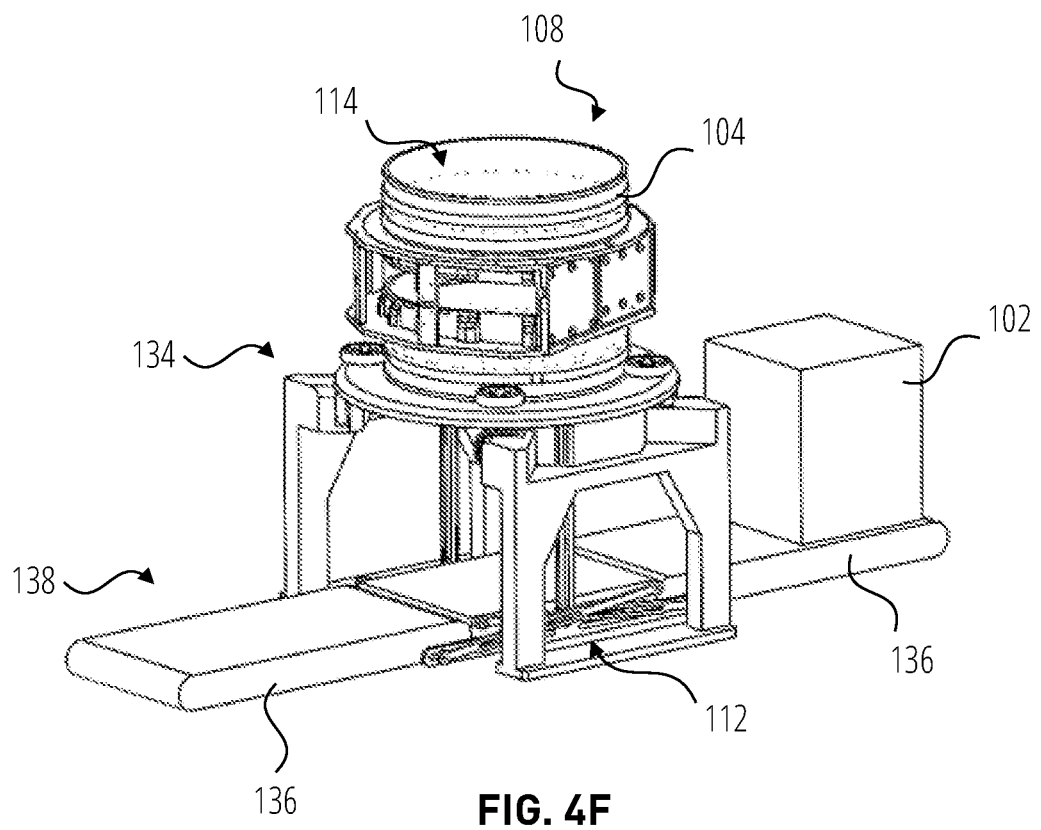
Figure 5:
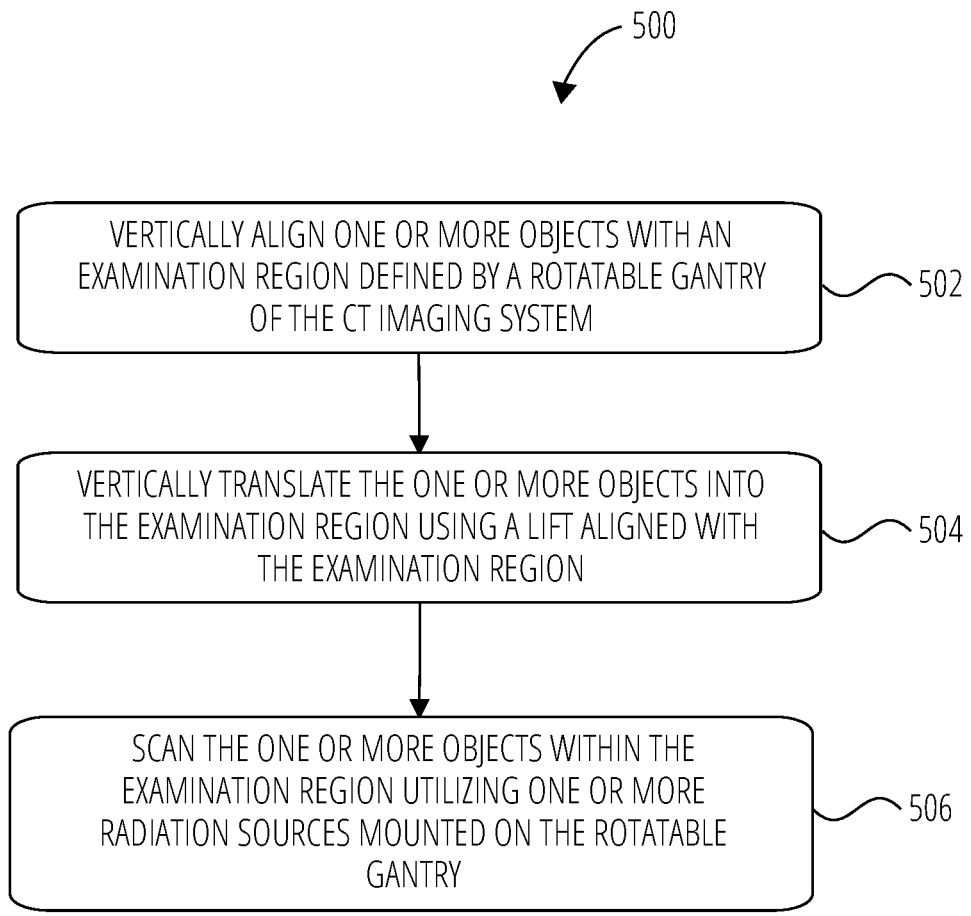
FIG. 5 is a flowchart of one illustrative embodiment of a method for scanning one or more objects of the present disclosure.

In various embodiments, after completion of act 506, the one or more objects is removed from the examination region and moved to a location for retrieval of the one or more objects, such as via another conveyor 136, as illustrated in FIG. 4F.

In the Brief Summary above and in the Detailed Description, the claims below, and in the accompanying drawings, reference is made to particular features (including method acts) of the present disclosure. It is to be understood that the disclosure includes all possible combinations of such particular features. For example, where a particular feature is disclosed in the context of a particular embodiment, or a particular claim, that feature can also be used, to the extent possible, in combination with and/or in the context of other particular aspects and embodiments described herein.

As used herein, the terms "adapted," "configured," and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, without limitation).

As used herein, the term "may" with respect to a material, structure, feature, function, or method act indicates that such is contemplated for use in implementation of an embodiment of the disclosure, and such term is used in preference to the more restrictive term "is" so as to avoid any implication that other compatible materials, structures, features, functions, and methods usable in combination therewith should or must be excluded.

The various illustrative logical blocks, modules, and circuits described in connection with the embodiments of the scanning system 100, and in particular, the data acquisition component 122, image reconstruction computer 124, terminal 126, and controller 132, disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Specific hardware implementations configured to perform the actions of controllers, modules, component and/or software objects or software routines described herein, may be stored on and/or executed by general purpose hardware (e.g., computer-readable media, processing devices, without limitation) of a computing system. In various examples, the different components, modules, software objects, and software routines described herein may be implemented as objects or processes that execute on a computing system (e.g., as separate threads, without limitation). While some of the system and methods described in the present disclosure are generally described as implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means "some or a totality." As used herein, the term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Example 1: A computer tomography (CT) imaging system, comprising: a rotatable gantry forming a bore defining an examination region, the rotatable gantry oriented with a central axis thereof in a substantially vertical direction and configured to scan one or more objects in a substantially horizontal plane; a lift aligned with an opening of the examination region, at least a portion of the lift sized to fit within the examination region and configured to move the one or more objects into the examination region; and one or more vertical bearings configured to rotationally support the rotatable gantry in the substantially vertical direction relative to the central axis and to support the weight of the rotatable gantry.

Example 2: The CT imaging system according to Example 1, wherein the lift is positioned below the rotatable gantry and is configured to raise the one or more objects up into the examination region of the rotatable gantry.

Example 3: The CT imaging system according to any of Examples 1 and 2, wherein the lift includes a conveyor system configured to position the one or more objects thereon prior to a scanning process and is configured to transport the one or more objects off of the lift after the scanning process is complete.

Example 4: The CT imaging system according to any of Examples 1 through 3, wherein portions of the lift are received within the examination region and at least the portions of the lift received within the examination region include material transparent to radiation.

Example 5: The CT imaging system according to any of Examples 1 through 4, wherein the lift is configured to move the one or more objects 102 in the vertical direction relative to one or more radiation sources mounted on the rotatable gantry between measurement intervals of a scanning process.

Example 6: The CT imaging system according to any of Examples 1 through 5, further comprising a frame configured to rotatably support the rotatable gantry while maintaining a vertical position of the rotatable gantry.

Example 7: The CT imaging system according to any of Examples 1 through 6, wherein the frame includes legs configured to support the rotatable gantry in an elevated position above the lift.

Example 8: The CT imaging system according to any of Examples 1 through 7, wherein the one or more vertical bearings are positioned between the frame and the rotatable gantry and configured to facilitate rotation of the rotatable gantry about the central axis relative to the frame.

Example 9: The CT imaging system according to any of Examples 1 through 8, further comprising one or more horizontal bearings configured to maintain a substantially concentric rotation of the rotatable gantry about the central axis.

Example 10: A computer tomography (CT) imaging system, comprising: a rotatable gantry forming a bore defining an examination region, the rotatable gantry oriented with a central axis thereof in a substantially vertical direction and configured to scan one or more objects in a substantially horizontal plane; a stationary support frame configured to support the rotatable gantry in a translationally fixed position; and one or more thrust bearings positioned between the stationary support frame and the rotatable gantry configured to support the weight of the rotatable gantry and facilitate rotation of the rotatable gantry about the central axis relative to the stationary support frame.

Example 11: The CT imaging system according to Example 10, further comprising an object translation system including a lift configured to move the one or more objects in the vertical direction into the examination region and a conveyor configured to move the one or more object to and from the lift.

Example 12: The CT imaging system according to any of Examples 10 and 11, wherein the stationary support frame includes legs configured to support the rotatable gantry in an elevated position above the object translation system.

Example 13: The CT imaging system according to any of Examples 10 through 12, wherein the lift is positioned below the rotatable gantry and is configured to raise the one or more objects up into the examination region of the rotatable gantry.

Example 14: The CT imaging system according to any of Examples 10 through 13, further comprising one or more radial bearings configured to maintain a substantially concentric rotation of the rotatable gantry about the central axis.

Example 15: The CT imaging system according to any of Examples 10 through 14, wherein each of the one or more thrust bearings and the one or more radial bearings includes wheel bearings.

Example 16: A method for scanning one or more objects with a computer tomography (CT) imaging system, comprising: vertically aligning one or more objects with an examination region defined by a rotatable gantry of the CT imaging system; vertically translating the one or more objects into the examination region using a lift aligned with the examination region; and scanning the one or more objects within the examination region utilizing one or more radiation sources mounted on the rotatable gantry.

Example 17: The method according to Example 16, wherein scanning the one or more objects includes capturing images of the one or more objects in measurement intervals and vertically moving the lift relative to the one or more radiation sources between the measurement intervals.

Example 18: The method according to any of Examples 16 and 17, wherein the CT imaging system includes a stationary support frame configured to support the rotatable gantry in a translationally fixed position.

Example 19: The method according to any of Examples 16 through 18, wherein the stationary support frame includes legs configured to support the rotatable gantry in an elevated position above the lift, and wherein vertically translating the one or more objects into the examination region using a lift aligned with the examination region includes elevating the one or more objects with the lift.

Example 20: The method according to any of Examples 16 through 19, wherein scanning the one or more objects within the examination region utilizing one or more radiation sources mounted on the rotatable gantry is performed by a mode selected from among: scanning in a first rotational direction during rotation of the rotatable gantry at one energy and one rotational speed; rescanning in a second rotational direction (opposite the first rotational direction) at a different energy than the one energy; scanning at a fixed vertical location of the one or more objects in response to one of a location selected by an operator of the CT imaging system, a detected anomaly at the location, and a detected threat at the location; and scanning the one or more objects with the rotatable gantry stationary and in a known angular position to produce a high resolution image of the one or more objects.

While the present disclosure has been described herein with respect to various illustrated embodiments and specific examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of various embodiments and specific examples while still encompassed within the scope of the invention as contemplated by the inventor.

What is claimed is:

1. A computer tomography (CT) imaging system, comprising:
   a rotatable gantry forming a bore defining an examination region, the rotatable gantry oriented with a central axis thereof in a substantially vertical direction and configured to scan one or more objects in a substantially horizontal plane;
   a lift aligned with an opening of the examination region, at least a portion of the lift sized to fit within the examination region and configured to move the one or more objects into the examination region; and one or more vertical bearings configured to rotationally support the rotatable gantry in the substantially vertical direction relative to the central axis and to support the weight of the rotatable gantry.

2. The CT imaging system of claim 1, wherein the lift is positioned below the rotatable gantry and is configured to raise the one or more objects up into the examination region of the rotatable gantry.

3. The CT imaging system of claim 1, wherein the lift includes a conveyor system configured to position the one or more objects thereon prior to a scanning process and is configured to transport the one or more objects off of the lift after the scanning process is complete.

4. The CT imaging system of claim 1, wherein portions of the lift are received within the examination region and at least the portions of the lift received within the examination region include material transparent to radiation.

5. The CT imaging system of claim 1, wherein the lift is configured to move the one or more objects in the substantially vertical direction relative to one or more radiation sources mounted on the rotatable gantry between measurement intervals of a scanning process.

6. The CT imaging system of claim 1, further comprising a frame configured to rotatably support the rotatable gantry while maintaining a vertical position of the rotatable gantry.

7. The CT imaging system of claim 6, wherein the frame includes legs configured to support the rotatable gantry in an elevated position above the lift.

8. The CT imaging system of claim 6, wherein the one or more vertical bearings are positioned between the frame and the rotatable gantry and configured to facilitate rotation of the rotatable gantry about the central axis relative to the frame.

9. The CT imaging system of claim 8, further comprising one or more horizontal bearings configured to maintain a substantially concentric rotation of the rotatable gantry about the central axis.

10. A computer tomography (CT) imaging system, comprising:
a rotatable gantry forming a bore defining an examination region, the rotatable gantry oriented with a central axis thereof in a substantially vertical direction and configured to scan one or more objects in a substantially horizontal plane;
a stationary support frame configured to support the rotatable gantry in a translationally fixed position; and
one or more thrust bearings positioned between the stationary support frame and the rotatable gantry configured to support the weight of the rotatable gantry and facilitate rotation of the rotatable gantry about the central axis relative to the stationary support frame.

11. The CT imaging system of claim 10, further comprising an object translation system including a lift configured to move the one or more objects in the substantially vertical direction into the examination region and a conveyor configured to move the one or more objects to and from the lift.

12. The CT imaging system of claim 11, wherein the stationary support frame includes legs configured to support the rotatable gantry in an elevated position above the object translation system.

13. The CT imaging system of claim 12, wherein the lift is positioned below the rotatable gantry and is configured to raise the one or more objects up into the examination region of the rotatable gantry.

14. The CT imaging system of claim 10, further comprising one or more radial bearings configured to maintain a substantially concentric rotation of the rotatable gantry about the central axis.

15. The CT imaging system of claim 14, wherein each of the one or more thrust bearings and the one or more radial bearings includes wheel bearings.

16. A method for scanning one or more objects with a computer tomography (CT) imaging system, comprising:
vertically aligning one or more objects within an examination region defined by a rotatable gantry of the CT imaging system, the rotatable gantry oriented with a central axis thereof in a substantially vertical direction and the CT imaging system including one or more vertical bearings configured to rotationally support the rotatable gantry in the substantially vertical direction relative to the central axis and to support the weight of the rotatable gantry;
vertically translating the one or more objects into the examination region using a lift aligned with the examination region; and
scanning the one or more objects within the examination region utilizing one or more radiation sources mounted on the rotatable gantry while rotating the rotatable gantry relative to the central axis oriented in the substantially vertical direction.

17. The method of claim 16, wherein scanning the one or more objects includes capturing images of the one or more objects in measurement intervals and vertically moving the lift relative to the one or more radiation sources between the measurement intervals.

18. The method of claim 16, wherein the CT imaging system includes a stationary support frame configured to support the rotatable gantry in a translationally fixed position.

19. The method of claim 18, wherein the stationary support frame includes legs configured to support the rotatable gantry in an elevated position above the lift, and wherein vertically translating the one or more objects into the examination region using a lift aligned with the examination region includes elevating the one or more objects with the lift.

20. The method of claim 16, wherein scanning the one or more objects within the examination region utilizing one or more radiation sources mounted on the rotatable gantry is performed by a mode selected from among: scanning in a first rotational direction during rotation of the rotatable gantry at one energy and one rotational speed; rescanning in a second rotational direction (opposite the first rotational direction) at a different energy than the one energy; scanning at a fixed vertical location of the one or more objects in response to one of a location selected by an operator of the CT imaging system, a detected anomaly at the location, and a detected threat at the location; and scanning the one or more objects with the rotatable gantry stationary and in a known angular position to produce a high resolution image of the one or more objects.

* * * * *